United States Patent Office 3,492,403
Patented Jan. 27, 1970

3,492,403
PRODUCTION OF LACTATION BY NONSEDATIVE PHENOTHIAZINE DERIVATIVES
Menashe Ben-David, Shabsay Dikstein, and Felix Gad Sulman, Jerusalem, Israel, assignors to the United States of America as represented by the Secretary of Agriculture
No Drawing. Filed Dec. 9, 1965, Ser. No. 512,803
Claims priority, application Great Britain, Jan. 7, 1965, 664/65
Int. Cl. A01n 9/00
U.S. Cl. 424—247
3 Claims

ABSTRACT OF THE DISCLOSURE

Lactation of adult female rats is stimulated by the subcutaneous injection of perphenazine and chlorpromazine sulfoxides. These compounds have little or no tranquilizing effect on the animals.

A non-exclusive, irrevocable, royalty-free license in the invention herein described, throughout the world for all purposes of the United States Government, with the power to grant sublicenses for such purposes, is hereby granted to the Government of the United States of America.

This invention relates to lactation produced by hypotholamic depressants, and particularly relates to mammotropic effects of specific derivatives of phenothiazine.

Isolated instances of abnormal lactation in patients receiving tranquilizing medication were noted as long as about fifteen years ago. A few years ago a publication reporting a rather comprehensive study of this subject concluded that the incidence of abnormal lactation appeared to be directly related to the quantity of tranquilizer administered. We have discovered, on the contrary, that no parallel exists between the tranquilizing and mammotropic effects of phenothiazine derivatives.

An object of the present invention is to provide a chemically stimulated mammotropic effect with none or no undue tranquilizing effect. A further object is to provide a pharmaceutical preparation containing as an active ingredient a phenothiazine derivative which produces a mammotropic effect without tranquilizing effects. Other objects and a fuller understanding of the invention will be apparent from the following description and claims.

According to the present invention lactation of mammals is stimulated by administering to the mammal a pharmaceutical preparation containing as the active ingredient a phenothiazine derivative of the formula

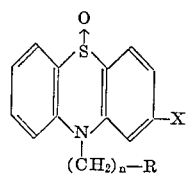

wherein X is selected from —Br, —Cl, —CF$_3$, —CN and —Y—R', wherein Y is selected from —S—,

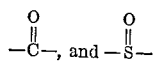

and R' is selected from methyl, ethyl and propyl; $n$ is an integer selected from 2 and 3; and R is selected from

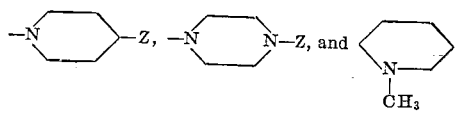

wherein Z is selected from —CH$_3$, —OH, —CH$_2$CH$_2$OH,

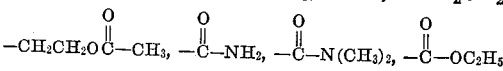

and —SO$_2$—N(CH$_3$)$_2$. In the above phenothiazin derivative, where X is Cl and $n$ is 3, R can also be the radical —N(CH$_2$)$_2$.

The sulfoxide compounds of the present invention are strongly mammotropic, but, most fortunately and unexpectedly, have no, or only very slight, tranquilizing activity. While the effectiveness of the active agents is attributed to a hypothalmic depressing effect whereby the at least partial withdrawal of the prolactin-inhibiting factor (PIF) allows an increase in secretion of prolactin, the particular means of stimulating lactation is not considered a limiting factor. The mammotropic effect of the process of the present invention is not eliminated by a preceding or concurrent treatment with antidepressants, such as amitriptyline or imipramine or by the MAO-blockers such as isocarboxazide or iproniazid. Thus, it is obvious that the mammotropic and tranquilizing effects of the perphenazine congeners derive from different parts of the molecule. The introduction of the sulfoxide function eliminates or greatly reduces the sedative or tranquilizing effect of the phenothiazine derivatives. A study of excretion of perphenazine using tritum-labeled material showed that the bulk of the phenothiazine derivative was excreted in the urine, thus being eliminated from the mammal and providing practical use of these compounds in increasing milk production.

After evaluating various physiological methods of prolactin assay, the procedure selected as most specific and reproducible for determining mammotropic effects was that based upon the mammary gland development of rats.

In this procedure the mammary gland of adult female rats is excised, mounted, fixed with Bouin's fixative, stained with hematoxylin, and inspected under a microscope. Photographs were taken for a permanent record of the condition of the specimen. The mammotropic index (MTI) with which the specimens are compared has five categories: I and II represent the normal gland pattern; III, IV and V represent increasing degrees of lactogenic effects; with V$a$ representing a fully developed gland in which the alveoles contain milk and V$b$ representing a gland from which milk has been ejected from the aveoles. Lactogenic effects are easy to recognize and grade because of the marked change in structure of the stained glands.

In the standard procedure employed to evaluate the compounds of the present invention the animals were adult female albino rats of the Hebrew University "Sabra" strain, weighing 200±10 g. each. For priming, the animals received daily 8 mcg. (microgram estradiol by subcutaneous injection in olive oil. From the 11th day, for 5 days, that is, up to the 15th day, the compound to be tested was injected (subcutaneous in 0.2 ml. olive oil). Twenty-four hours after the last injection all animals were sacrificed and their right inguinal mammary gland removed. The tissue was pinned on flat cork, fixed in Bouin's fluid for 24 hours, and stained with hematoxylin. The MTI was observed and recorded. A score of I or II is considered negative and was obtained for unprimed controls, controls of animals primed as described, and for animals receiving compounds which are ineffective. A score of III was considered borderline and further testing was conducted on these compounds. An MTI of IV or V was a definite positive response. Typically, ten rats were tested with each compound (and at each level of dosage if applied at more than one level) to compensate for subjective differences in animals.

The mammotropic index is based on the publication of J. E. Lane-Clayton and E. H. Starling, Proc. Roy. Soc. B.

77: 505 (1906) and is further illustrated in our publication in Proc. Soc. Expt'l. Biol. and Med., 118: 265–270 (1965).

While the active ingredient for lactogenic effects was currently administered in olive oil, this oil is not critical to the invention, and any other physiologically acceptable carrier medium may be used in place of olive oil. It will be understood that the modes of application and dosages can be adjusted according to the intended effects and the potency of the specific derivative which is used.

The data as collected were first summarized as shown in Table I, which shows the individual MTI ratings. Subsequently, the mean MTI of the effect of the phenothiazine derivatives were calculated and the compounds listed in decreasing order of their lactogenic effect as presented in Table II.

TABLE I.—MAMMOTROPIC EFFECT IN ESTROGEN-PRIMED FEMALE RATS OF 200±10 G. WEIGHT AFTER 5 DAYS' TREATMENT WITH DIFFERENT PHENOTHIAZINE DERIVATIVES

| Name of Phenothiazine Derivative | Daily Dose, mg./kg. | No. of Animals | Mammotropic Index (M.T.I.) (number of animals reacting) | | | | | |
|---|---|---|---|---|---|---|---|---|
| | | | I | II | III | IV | Va | Vb |
| Perphenazine·HCl | 1 | 8 | | 2 | 2 | 4 | | |
| | 5 | 10 | | | | 3 | 5 | 2 |
| | 10 | 10 | | | | | 4 | 6 |
| | *15 | 10 | | | | | 2 | 8 |
| Perphenazine sulfoxide·HCl | 13 | 10 | | 2 | | 6 | 2 | |
| Fluphenazine·HCl | 10 | 10 | | | | 4 | 6 | |
| Trifluoperazine·HCl | 10 | 10 | | | | 6 | 4 | |
| Thiopropazate·HCl | 5 | 10 | | | | 3 | 7 | |
| Butyrylperazine·HCl | 20 | 10 | | | | 8 | 2 | |
| Thioridazine·HCl | 10 | 10 | | | 4 | 4 | 2 | |
| Chlorpromazine·HCl | *40 | 10 | | | 5 | 5 | | |
| Chlorpromazine sulfoxide·HCl | 40 | 10 | | 4 | 4 | 2 | | |
| Dixyrazine·HCl | 45 | 10 | 3 | 7 | | | | |
| Promazine·HCl | 40 | 10 | 2 | 4 | 4 | | | |
| Aminopromazine·HCl | 10 | 10 | 6 | 2 | 2 | | | |
| Levomepromazine·HCl | 10 | 8 | 3 | 1 | 2 | | | |
| Methopromazine·HCl | 10 | 10 | 2 | 8 | | | | |

* Sedative dose.

TABLE II.—MAMMOTROPIC EFFECT OF PHENOTHIAZINE DERIVATIVES OF THE FORMULA

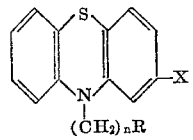

| Name | X | $(CH_2)_nR$ | Daily Dose, mg./kg. | Mammotropic Index (mean) |
|---|---|---|---|---|
| Piperacetazine | $-\overset{O}{\overset{\|}{C}}-CH_3$ | $-(CH_2)_3-N\underset{}{\bigcirc}N-CH_2-CH_2OH$ | 5 | 4.8 |
| Propericiazine | $-CN$ | $-(CH_2)_3-N\underset{}{\bigcirc}-OH$ | 5 | 4.7 |
| Perphenazine | $-Cl$ | $-(CH_2)_3-N\underset{}{\bigcirc}N-CH_2-CH_2OH$ | 5 | 4.7 |
| Thiopropazate | $-Cl$ | $-(CH_2)_3-N\underset{}{\bigcirc}N-CH_2CH_2O\overset{O}{\overset{\|}{C}}-CH_3$ | 5 | 4.6 |
| Fluphenazine | $-CF_3$ | $-(CH_2)_3-N\underset{}{\bigcirc}N-CH_2-CH_2OH$ | 10 | 4.5 |
| Pipamazine | $-Cl$ | $-(CH_2)_3-N\underset{}{\bigcirc}-\overset{O}{\overset{\|}{C}}-NH_2$ | 5 | 4.5 |
| Thiethylperazine | $-SC_2H_5$ | $-(CH_2)_3-N\underset{}{\bigcirc}N-CH_3$ | 10 | 4.4 |
| Trifluorperazine | $-CF_3$ | $-(CH_2)_3-N\underset{}{\bigcirc}N-CH_3$ | 10 | 4.4 |
| NC-123 | $-\overset{O}{\overset{\|}{S}}-CH_3$ | $-CH_2-CH_2-\underset{\underset{CH_3}{\|}}{N}\bigcirc$ | 10 | 4.4 |
| TPO-33 | $-\overset{O}{\overset{\|}{C}}-CH_3$ | $-CH_2-CH_2-\underset{\underset{CH_3}{\|}}{N}\bigcirc$ | 10 | 4.4 |
| SKF-7100-A | $-CF_3$ | $-(CH_2)_3-N\underset{}{\bigcirc}N-\overset{O}{\overset{\|}{C}}-N(CH_3)_2$ | 5 | 4.4 |

TABLE II—Continued

| Name | X | $(CH_2)_nR$ | Daily Dose, mg./kg. | Mammotropic Index (mean) |
|---|---|---|---|---|
| Acetophenazine | $-\overset{O}{\underset{\|}{C}}-CH_3$ | $-(CH_2)_3-N\diagup\diagdown N-CH_2-CH_2OH$ | 5 | 4.2 |
| Butyrylperazine | $-\overset{O}{\underset{\|}{C}}-C_3H_7$ | $-(CH_2)_3-N\diagup\diagdown N-CH_3$ | 20 | 4.2 |
| SKF-7221-I | $-CF_3$ | $-(CH_2)_3-N\diagup\diagdown N-\overset{O}{\underset{\|}{C}}-O-C_2H_5$ | 5 | 3.8 |
| SKF-7136-A | $-CF_3$ | $-(CH_2)_3-N\diagup\diagdown N-SO_2-N(CH_3)_2$ | 5 | 3.8 |
| Proketazine | $-\overset{O}{\underset{\|}{C}}-C_2H_5$ | $-(CH_2)_3-N\diagup\diagdown N-CH_2-CH_2OH$ | 5 | 3.8 |
| Thioridazine | $-SCH_3$ | $-CH_2-CH_2\diagup\diagdown\underset{\underset{CH_3}{\|}}{N}\diagdown\diagup$ | 5 | 3.2 |

Since the introduction of a sulfoxide moiety into phenothiazine derivatives typically reduces the tranquilizing effect to 5% or less than that of the parent compound, lactogenic effects of the compounds of the present invention can be obtained without tranquilizing effects even though the sulfoxide derivative is used at a dozage level equal to or somewhat higher than the level at which the parent compound is a tranquilizer or sedative. This difference is illustrated in Table I with comparison of perphenazine and the corresponding sulfoxide and chlorpromazine and chlorpromazine sulfoxide. Triflupromazine sulfoxide, not a preferred compound for lactognic effect, was administered at a level of 200 mg./kg./day without causing sedation.

The compounds listed in Table I and Table II are presented to demonstrate the present invention but are not intended to be in limitation thereof. It will be obvious from consideration of the derivatives exemplified that numerous other combinations of functional groups are included in the scope of the present invention.

We claim:
1. A method for activating lactation in rats without sedation which comprises subcutaneously injecting rats with 13 and 40 mg. per kilogram of body weight, respectively, in a physiologically acceptable carrier of a compound of the formula

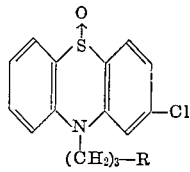

where R is a member of the group consisting of

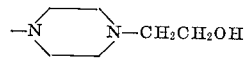

and $-N(CH_3)_2$.

2. The method of claim 1 in which R is

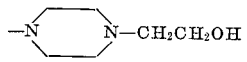

3. The method of claim 1 in which R is $-N(CH_3)_2$.

References Cited

Cutting: Handbook of Pharmacology, 1964, pp. 558–560.

Khazan et al.: Arch. Int. Pharmacodyn., 1962, CXXXXI, No. 3–4, pp. 291–304.

Emmerson et al.: J. of Pharm. Sciences, 52, May 1963, pp. 411–412.

Davidson et al.: J. Pharmacol Exp'l. Therap. September 1957, pp. 8–12.

ALBERT T. MEYERS, Primary Examiner

STANLEY J. FRIEDMAN, Assistant Examiner